United States Patent [19]
Harrigan

[11] Patent Number: 5,946,141
[45] Date of Patent: Aug. 31, 1999

[54] APOCHROMATIC LENS SYSTEM FOR RELAYING LASER BEAM WAISTS

[75] Inventor: Michael E. Harrigan, Webster, N.Y.

[73] Assignee: Eastman Kodak Company, Rochester, N.Y.

[21] Appl. No.: 09/105,301

[22] Filed: Jun. 26, 1998

[51] Int. Cl.⁶ .................................................. G02B 1/00
[52] U.S. Cl. ............................................ 359/642; 359/708
[58] Field of Search ...................................... 359/708, 642

[56] References Cited

U.S. PATENT DOCUMENTS

| | | | |
|---|---|---|---|
| 4,909,616 | 3/1990 | Arai | 359/708 |
| 4,942,583 | 7/1990 | Nazarathy | 372/102 |
| 5,069,527 | 12/1991 | Johnson, Jr. et al. | 359/823 |
| 5,270,851 | 12/1993 | Makino et al. | 359/710 |
| 5,491,587 | 2/1996 | Iwaki et al. | 359/641 |
| 5,666,447 | 9/1997 | Chuang et al. | 385/31 |
| 5,694,251 | 12/1997 | Shimada et al. | 359/662 |

*Primary Examiner*—Scott J. Sugarman
*Attorney, Agent, or Firm*—Svethlana Z. Short

[57] ABSTRACT

A lens system comprises a plurality of lens elements including at least one positive power lens element and at least one negative power lens element, the plurality of lens elements having radii of curvature, thicknesses, indices of refraction, Abbe V numbers and partial dispersion coefficients so as to provide in combination (i) magnification M so that $5<M<20$; (ii) magnification variation $\Delta M<5\%$ for 0.46 to 0.7 micron wavelength range; and (iii) beam waist images located along an optical axis with axial positions being less than 0.3 Rayleigh distances from an image plane.

18 Claims, 10 Drawing Sheets

APOCHROMATIC LENS SYSTEM FOR RELAYING LASER BEAM WAISTS

FIELD OF THE INVENTION

This invention relates to an achromatic lens system for relaying a plurality of laser beam waists from a first common location to a second common location.

BACKGROUND OF THE INVENTION

An achromatic lens system is used to bring light rays (referred to as "rays") of two wavelengths to the same focus, for example, rays with wavelengths near the end of the visible spectrum (red and blue). FIG. 1A illustrates a typical achromatic doublet. This Figure shows that the blue (B) and red (R) rays cross the optical axis O.A. at the same location, while the green (G) rays cross the optical axis closer to the doublet. FIG. 1B illustrates a typical ray intercept plot of the achromatic doublet (in three wavelengths). This figure shows the amount of transverse ray error $\Delta Y$, in millimeters, on the vertical axis and the relative entrance pupil height of the ray on the horizontal axis. The entrance pupil is defined as the image of the aperture stop as viewed from object space. Relative entrance pupil height h is the fractional height of the entering ray on the entrance pupil aperture.

More specifically, FIG. 1B shows three curves corresponding to three wavelengths of visible light, green G=0.5876, blue B=0.4861, and red R=0.6563 microns. It can be seen that the red and blue wavelength curves intersect. These intersections occur near the edges of the figure and correspond to the rays passing at the edge of the entrance pupil (maximum relative pupil height, h=±1). This type of chromatic correction is generally recommended and works well for light beams of uniform intensity.

The locations of paraxial foci of the lens system are determined by the slope of these curves at the origin, and it can be seen in FIG. 1B that these slopes are different. Thus, the paraxial foci for different wavelengths are not in the same location in this lens system. It is well known that transverse ray error due to a pure focus shift corresponds to a straight line through the origin of a ray intercept plot. When paraxial rays only are considered, focus shift error is the only possible error. FIG. 1B shows two curves (R and B) with positive slope and one curve (G) with a negative slope. A curve with a positive slope indicates that the paraxial focus for that wavelength is located to the right of the image plane at which the transverse ray error $\Delta Y$ is plotted, or farther away from the lens system. A curve with a negative slope indicates that the paraxial focus for that wavelength is located to the left of the image plane, closer to the lens system. Therefore, FIG. 1B indicates that the red and blue paraxial rays focus further from the lens system than the green paraxial rays, and that the blue paraxial rays focus closer to the green paraxial rays than the do the red paraxial rays. This is shown in FIG. 1C, where Rp, Bp and Gp are red, blue and green paraxial rays.

An apochromatic lens system is similar to an achromatic lens system except that it is designed to focus three or more wavelengths to the same location. It is noted that because of the design difficulty and glass costs of correcting three or more wavelengths, most lens systems are achromatic and not apochromatic. However, apochromatic lens systems are well known. Applications for such apochromatic lens systems can be found in telescopes, microscopes, cameras, and some finite conjugate relay systems. Typical chromatic correction for an apochromatic lens system is shown in the ray intercept plots of FIG. 2. This figure illustrates that the rays of all three wavelengths passing through the edge entrance pupil (h=1) have substantially the same height $\Delta Y$ at the image plane. This type of chromatic correction works well for multiple wavelength light beams of uniform intensity. FIG. 2 also discloses that the image plane is located at the green paraxial focus, but the red paraxial focus is focused farther from the lens system and the blue paraxial focus is closer to the lens system.

Ideal laser beams have Gaussian intensity profiles and because of this laser beams are often referred to as Gaussian beams. A Gaussian intensity profile is illustrated in FIG. 3A. Focused laser beams do not come to a single point, but form a beam waist (FIG. 3B). A beam waist is a portion of a laser beam that has a smaller cross section than the adjacent areas. Beam waists, like the rest of the laser beams also have Gaussian intensity profiles.

Conventional aberration (including chromatic aberration) correction methods of lens systems assume a uniform intensity light beam and attempt to minimize the total image blur from all rays over the whole entrance pupil. Such methods do not provide the best aberration correction for lens systems that are used with laser beams and, if a lens system is designed to be apochromatic for a uniform intensity light beam, do not assure that the beam waists of different wavelengths have the same location on the optical axis. The reasons for this are as follows:

A laser beam is much less intense at the margins than a uniform intensity light beam because the intensity drops off rapidly from the center of the beam. Thus, a conventional method that gives equal weight to all of the rays across the entrance pupil does not result in lens system that is well corrected for use with laser beams. In addition, the beam waist locations are not the same as paraxial foci location. Finally, conventional apochromatic lens systems are usually designed to work at an infinite conjugate (distant object), while lens systems for re-imaging beam waists operate at finite conjugates. Aberrations change with a shift of conjugates, so a lens system with a chromatic correction for an infinite conjugate would not generally work well at finite conjugates.

The term "chromatic correction" can mean that different wavelengths rays passing by the edge of the entrance pupil have nearly the same focus (as illustrated in FIGS. 1B and 2), or it can mean having the paraxial focus correction- i.e., having the same paraxial focus location for three or more wavelengths. An example of a ray intercept plot showing transverse ray aberration curves of an apochromatic lens system with paraxial focus correction is shown in FIG. 4. Since focus shift (represented on these aberration curves as a non-zero slope at the origin) is absent in these curves, this lens system has the same paraxial focus for the three wavelengths. FIG. 5 illustrates the paraxial focus shift as a function of wavelength for the same apochromatic lens system. This figure shows that the apochromatic lens system has five wavelengths focusing at the same paraxial image plane. This figure also shows that this apochromatic lens system provides a superb correction for wavelengths from 0.43 microns to 0.76 microns, the paraxial focus being within 10 microns across the whole wavelength range. While this would be an excellent conventional apochromatic lens system, it does not perform well when reimaging beam waists. This is because laser beam waists of different wavelengths across the visible spectrum are imaged by this apochromatic lens system at different image locations, as shown in FIG. 6. This is because, as stated above, the location of an imaged beam waist is not generally the same as the location of the paraxial focus.

U.S. Pat. Nos. 4,909,616 and 5,270,851 disclose lens systems for color correction of laser beams over relatively small wavelength ranges, such as found in monochromatic lasers during mode hopping. These lens systems are not corrected over the whole visible spectrum.

U.S. Pat. No. 5,694,251 discloses an F-theta lens system that is corrected for the lateral color aberration, but this an F-theta lens does not image beam waists of different wavelengths to a common location along the optical axis, which is more akin to axial color, the variation of focus with wavelength.

A collimating lens system corrected for chromatic variation in an infrared wavelength band is disclosed in U.S. Pat. No. 5,491,587. This lens system is not a finite conjugate lens system and does not image magnified multiple color beam waists to a common image location.

SUMMARY OF THE INVENTION

It is an object of the present invention to re-image a plurality of laser beam waists of different wavelengths located at one common location to another, substantially common location.

According to this invention, a lens system comprises a plurality of lens elements including at least one positive power lens element and at least one negative power lens element, the plurality of lens elements having radii of curvature, thicknesses, indices of refraction, Abbe V numbers and partial dispersion coefficients so as to provide in combination (i) magnification M so that 5<M<20; (ii) magnification variation ΔM<5% for 0.46 to 0.7 micron wavelength range; and (iii) beam waist images located along an optical axis with axial positions being less than 0.3 Rayleigh distances from an image plane.

DETAILED DESCRIPTION OF THE INVENTION

Figure 1A:
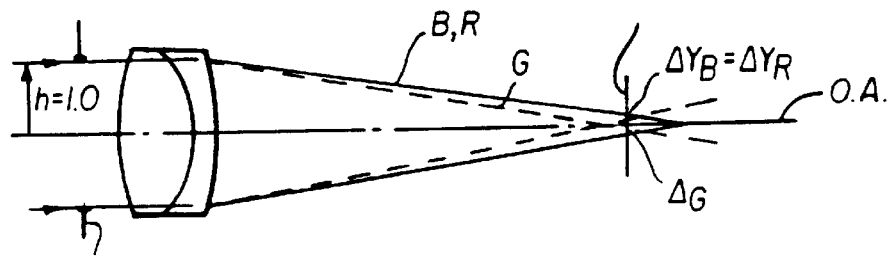
FIG. 1A illustrates a typical achromatic doublet.
Figure 1B:
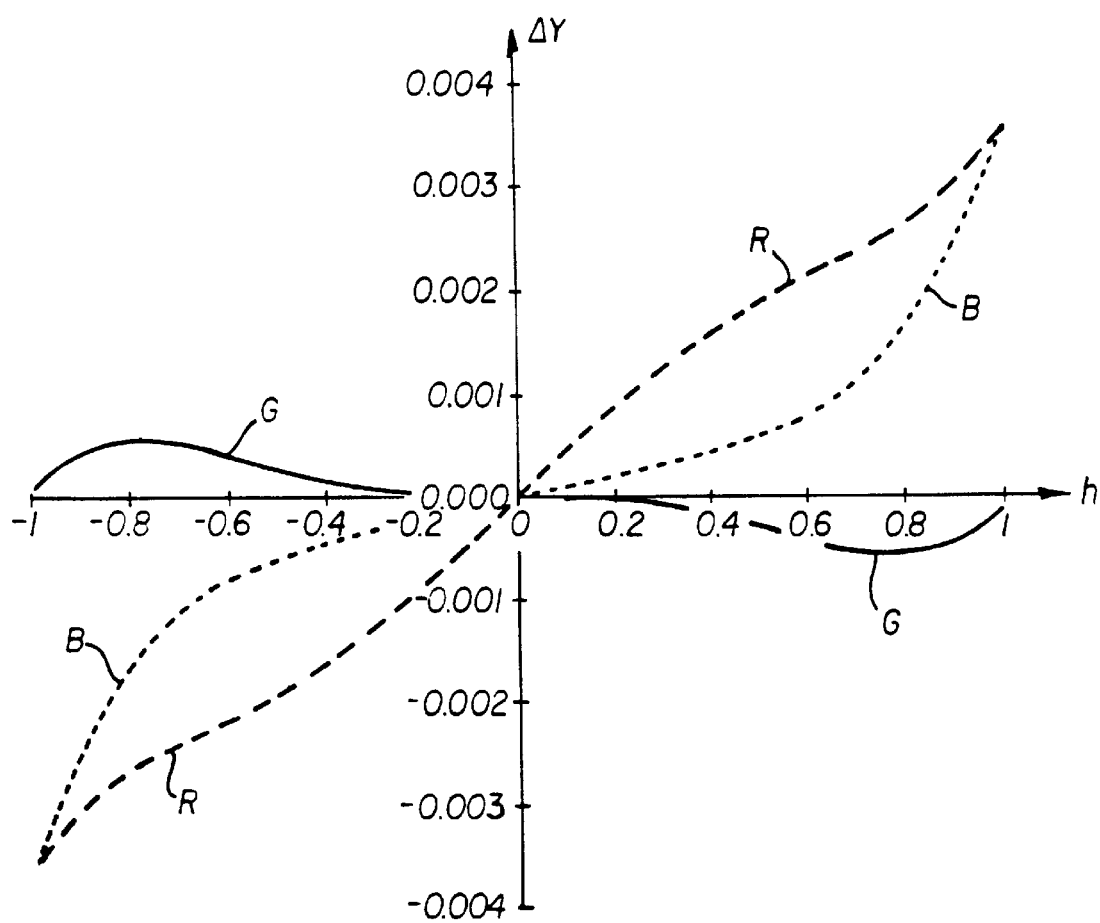
FIG. 1B is a ray intercept plot for the achromatic doublet of FIG. 1A. It shows achromatic correction for the rays passing at the edge of the entrance pupil.
Figure 1C:
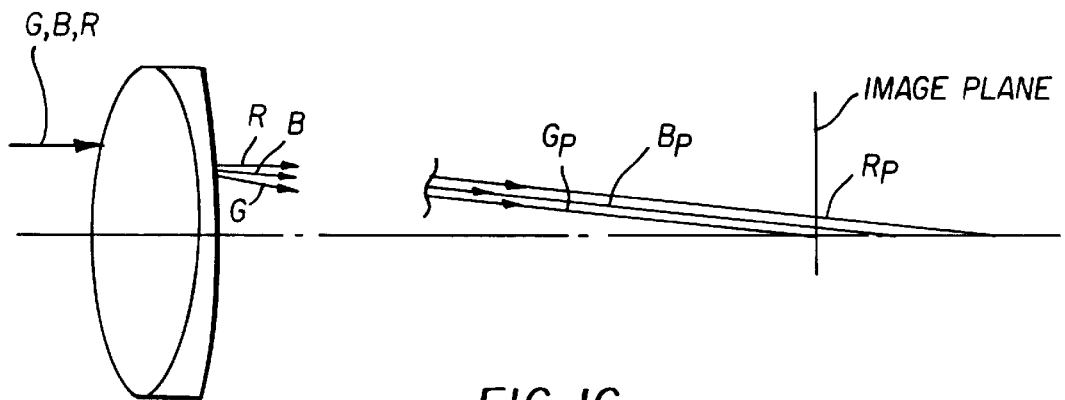
FIG. 1C illustrates the location of paraxial foci for the achromatic doublet of FIG. 1A.
Figure 2:
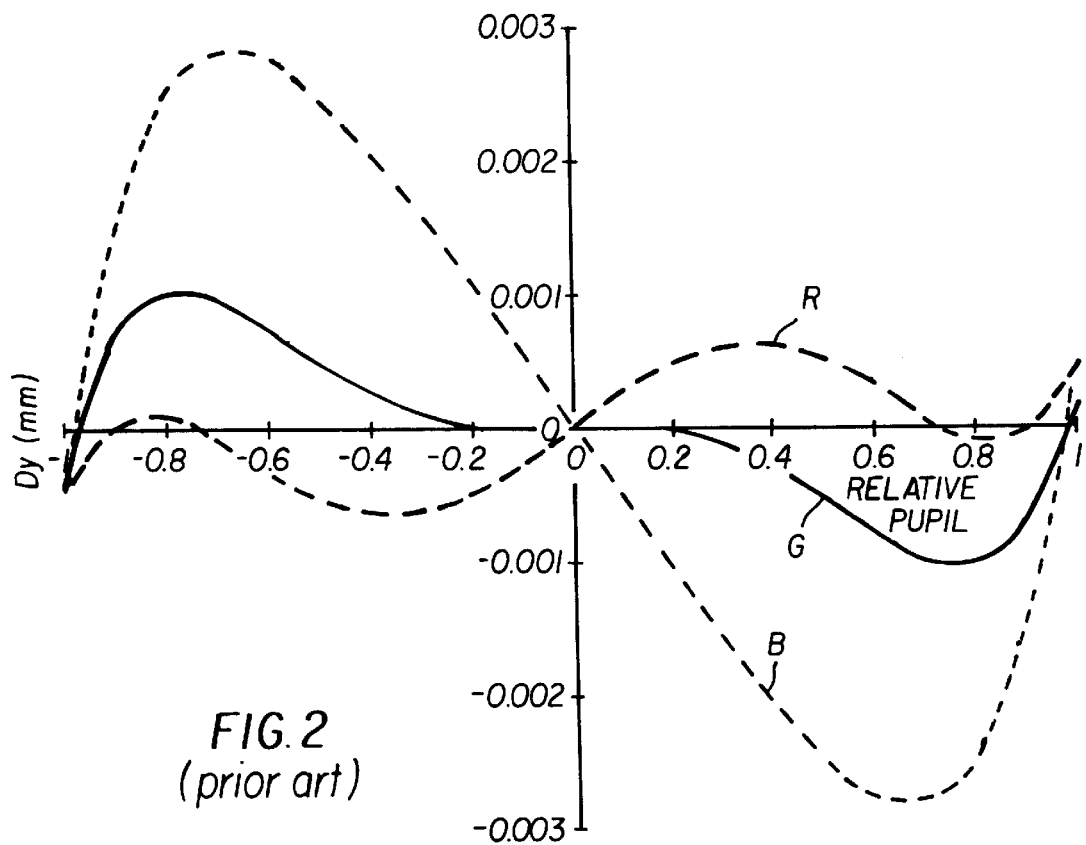
FIG. 2 is a ray intercept plot for an apochromatic lens system.
Figure 3B:
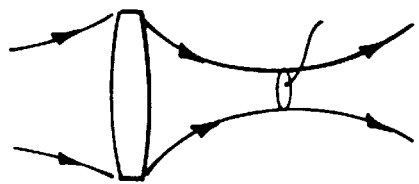
FIG. 3B illustrates a laser beam waist.
Figure 3A:
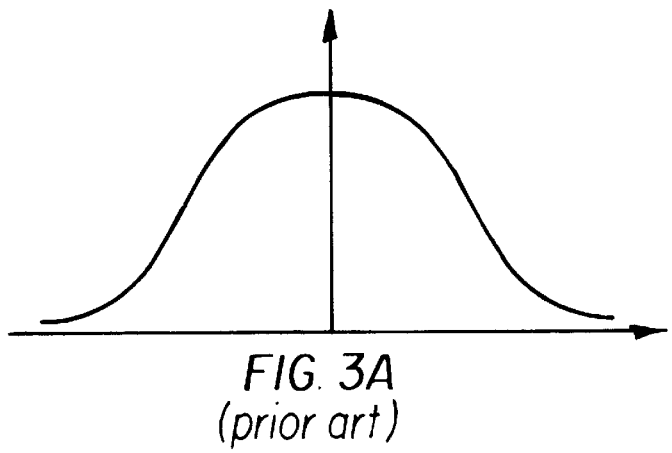
FIG. 3A illustrates an intensity profile of a laser beam.
Figure 4:
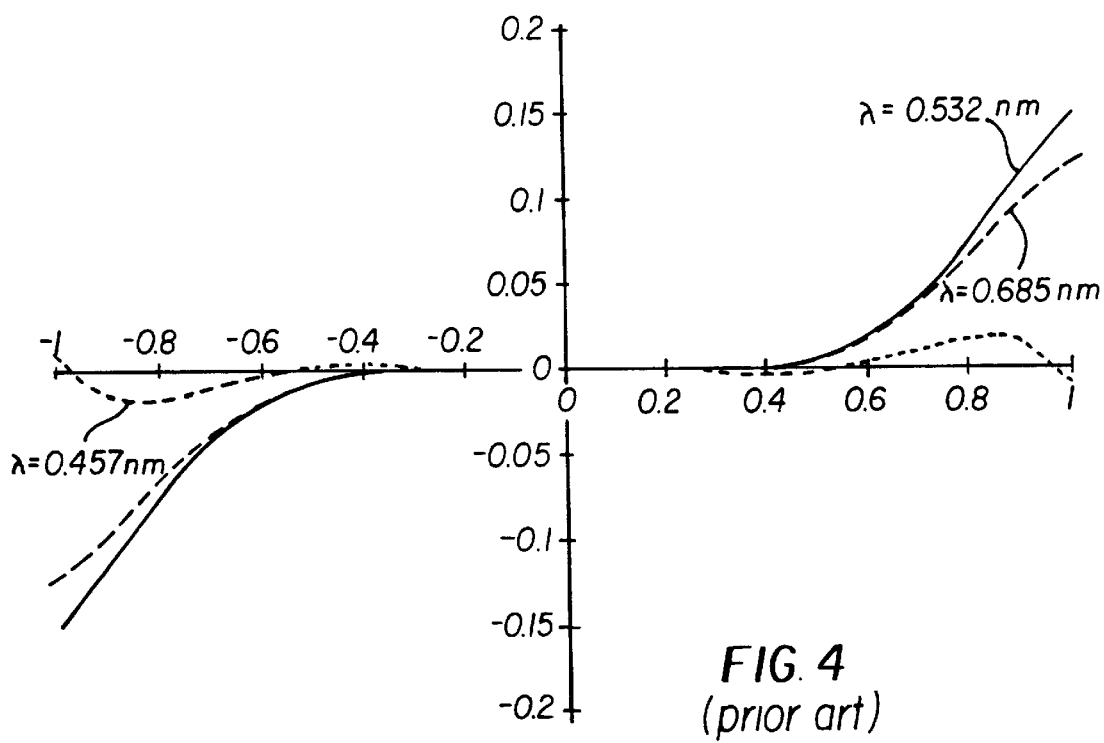
FIG. 4 is a ray intercept plot for an apochromatic lens system with a paraxial focus correction.
Figure 5:
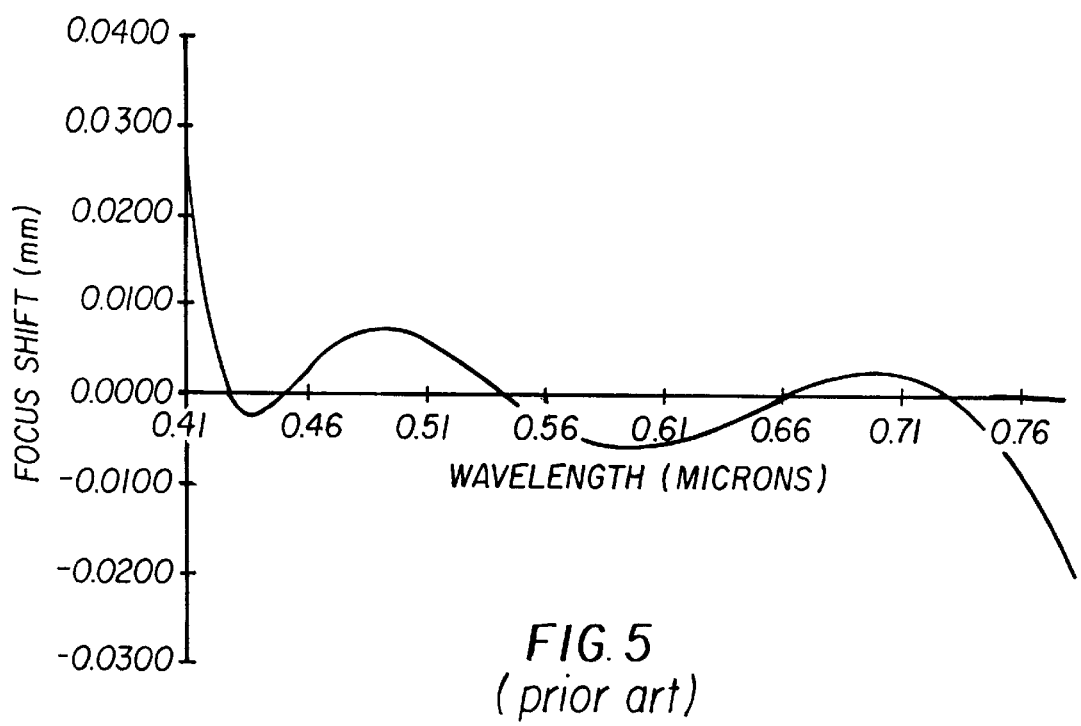
FIG. 5 is a plot of the focus shift versus wavelength for the apochromatic lens system with the paraxial focus correction.
Figure 6:
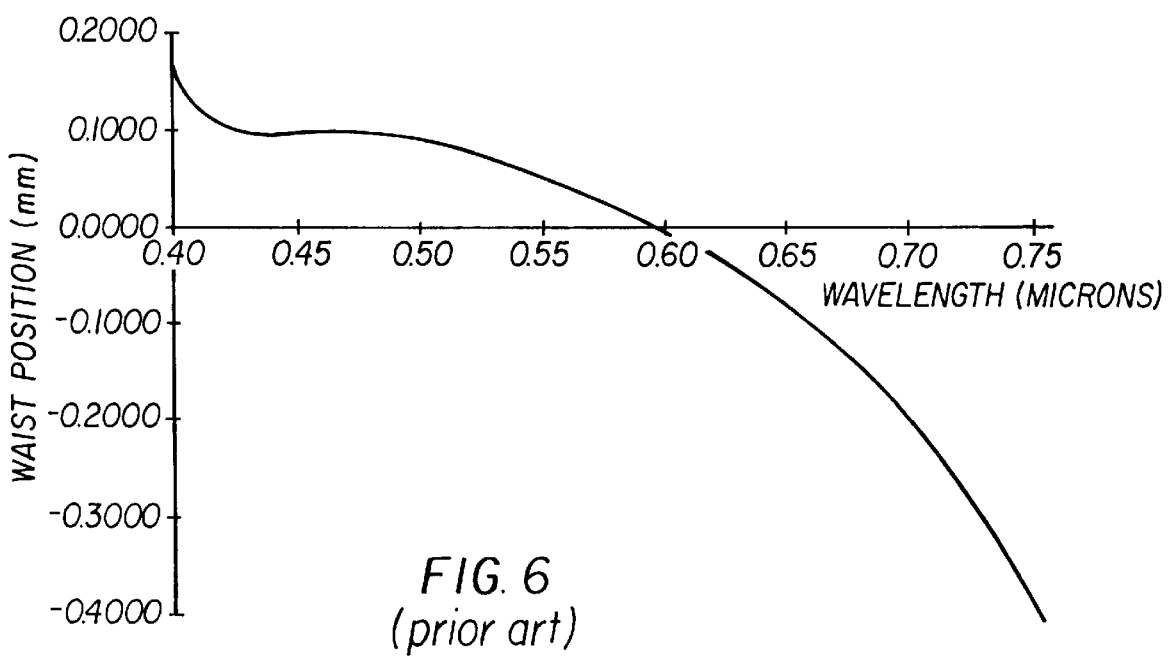
FIG. 6 is a plot of the beam waist position versus wavelength for the apochromatic lens system with the paraxial focus correction.
Figure 7A:
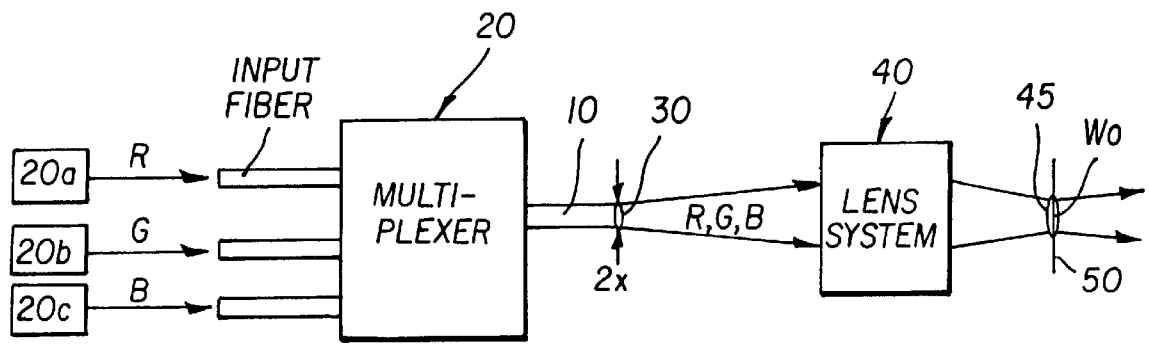
FIG. 7A is a schematic illustration of an optical system that includes a multiplexer with single mode beam combining fiber, and a lens system for reimaging beam waists provided by this fiber.
Figure 7B:
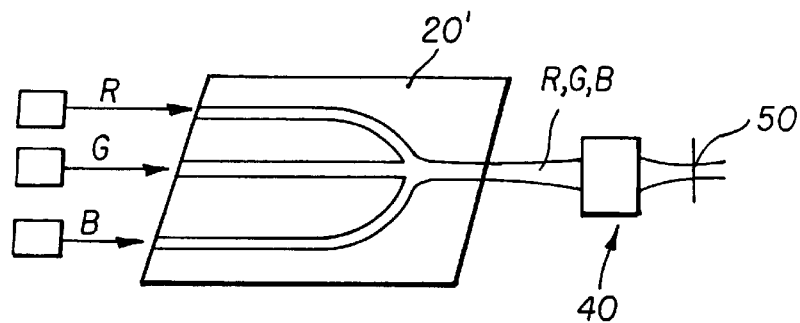
FIG. 7B is a schematic illustration of an optical system that includes a beam combining waveguide, and a lens system for reimaging beam waists provided by this waveguide.
Figure 7C:
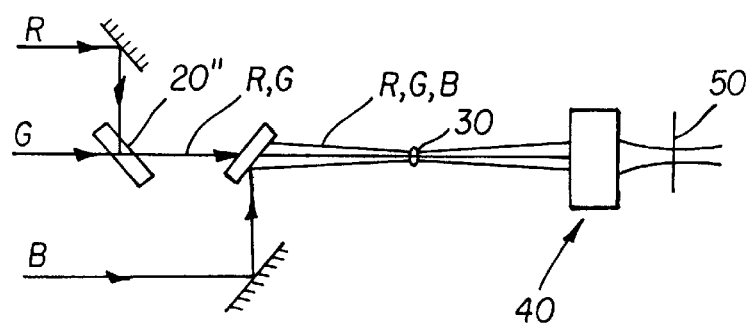
FIG. 7C is a schematic illustration of an optical system that includes a plurality of beam combining optical components, and a lens system for reimaging beam waists.
Figure 7D:
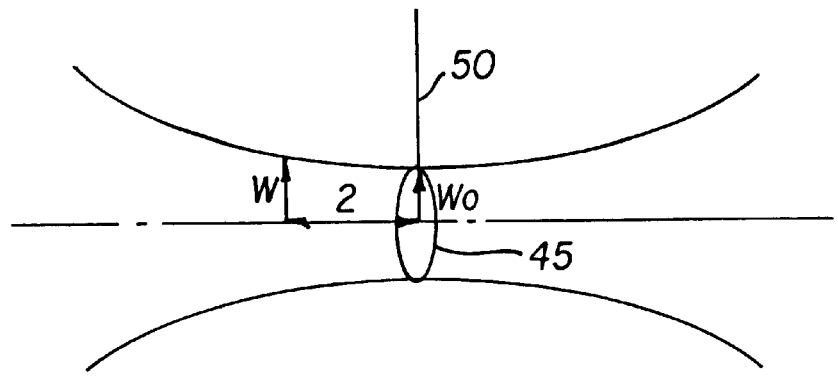

According to an embodiment of the present invention an optical system includes a composite source of laser beams of different wavelengths (red R, green G and blue B, for example) providing beam waists (R, G, B) in a first common location, and a lens system for re-imaging the beam waists to a second common location, which is at or in close proximity to the image plane. The composite source may be a single mode beam combining fiber 10 (see FIG. 7A) of a multiplexer 20 that combines laser beams from different wavelength lasers 20a, 20b, 20c. Such a multiplexer is described in U.S. Pat. No. 5,666,447. This beam combining fiber 10 provides red, blue and green beam waists 30 (thereafter called input beam waists) at its output end (i.e., the first common location). The lens system 40 re-images these input beam waists, forming the output beam waists 45 at the second common location 50). Other ways of providing input beam waists at a common location to the lens system 40 are, for example, by using a waveguide 20' or beam combining optical components 20" (see FIGS. 7B and 7C).

It is well known that the size of a re-imaged beam waist depends on the size of an input beam waist and the magnification of a lens system. If the input beam waist 30 is provided by a single mode fiber (such as the beam combining fiber 10 from the multiplexer 20), its $e^{-2}$ waist radius, r, may be obtained from the following formula provided on page 3.12 of Fiber Optics Handbook, McGraw-Hill, New York, 1989, by Frederick C. Allard.

$$\frac{r}{a} = .65 + \frac{1.619}{V^{\frac{3}{2}}} + \frac{2.879}{V^6} \qquad (1)$$

In this formula, $a$ is the fiber core radius, and V is given by:

$$V = a(NA)\frac{2\pi}{\lambda}, \qquad (2)$$

where NA is the numerical aperture of the single mode fiber and λ is the wavelength of the laser beam. One can multiply the magnification M of the lens system 40 by the $e^{-2}$ waist radius r to obtain the radius of the output beam waist. As can be seen, the size of the input beam waist depends on the wavelength of the laser beam, so the size of the output beam waist will also depend on the wavelength.

The lens system 40 for imaging a set of input beam waists 30 to a set of output beam waists 45 positioned at a substantially common location 50 should satisfy the following three requirements.

First, the amount of permissible image plane shift z from the output beam waist location should be very small. The amount of permissible shift z is specified by the amount of allowable laser beam size spread with respect to its waist size. If the amount of image plane shift z is small, the amount of laser beam spread is also small. The following formula relates the beam size $\omega$ to waist size $\omega o$ for a given amount of image plane shift z.

$$\omega = \omega_0 \sqrt{1 + \left(\frac{z}{z_R}\right)^2} \tag{3}$$

In this equation, $\omega$ is the $e^{-2}$ radius of the laser beam intensity measured across the beam; z is the distance (focus shift) along the optical axis from the beam waist (with a radius $\omega_0$), which is located at z=0, to the image plane. The Rayleigh distance, $z_R$, is $$\frac{\pi \omega_0^2}{\lambda},$$

where $\lambda$ is the wavelength of the laser beam. Using this equation one can show that the laser beam will grow less than 2% if $z/z_R$ is less than 0.2. For a 5% growth, z must be less than $0.32 z_R$. It is preferred that the maximum beam growth be 5% or less at the image plane location. It is even more preferable that the maximum laser beam growth be 2% or less.

The second requirement is a substantially constant magnification for all the beam waists re-imaged by the lens system 40 across the visible spectrum. The magnification M is the ratio of the beam waist radius at the image plane to the beam waist radius of the object plane (the first common location). That is, $M = \omega o_{out}/\omega o_{in}$. For example, the beam waist radius at the object plane may be the size of the beam waist radius at the output end of the beam combining fiber 10 (i.e., $\omega o_{in}$=r, which is given by the equation (1)). It is preferred that the magnification M be between 5 and 20 and that the magnification variation $\Delta M$ be less than 5%. It is more preferable that $\Delta M \leq 4\%$ and even more preferable that $\Delta M \leq 2\%$. It is most preferable for $\Delta M \leq 1\%$.

The third requirement is to ensure that the output beam waists are located close to the paraxial image plane. If the output beam waist locations are too far from the paraxial image plane, then focus shift aberration due to chromatic focal errors could limit lens system's performance. This departure from the paraxial focus can be evaluated as follows. The wavefront aberration W due to a defocus $\Delta z$ (i.e., the amount of focus shift) from a paraxial image in air is given by:

$$W = \frac{1}{2} \Delta z u'^2, \tag{4}$$

where W is measured in the same units as $\Delta Z$. Thus, $\Delta Z = 2W/u'^2$. In these equations, u' is the convergence angle of the marginal paraxial ray which for a laser beam is:

$$u' = \frac{\lambda}{\pi \omega_0}, \tag{5}$$

where $\lambda$ is the wavelength of the laser beam. The angle u' is measured to the $e^{-2}$ intensity point of the laser beam. Thus, $$\Delta Z = 2W(\pi \omega_0)^2/\lambda \tag{6}$$

If W is the maximum allowable wavefront error, then the defocus $\Delta Z$ is $$\Delta Z \leq \frac{2\pi^2 \omega_0^2}{\lambda}\left(\frac{W}{\lambda}\right) \tag{7}$$

Where $W/\lambda$ is the wavefront error due to defocus and is measured in number of wavelengths.

For diffraction limited performance, W must be less than 0.25 wavelengths and if this is substituted into equation (7) and in turn written in terms of the Rayleigh distance $z_R$ defined above, we get the following requirement for the allowable defocus $\Delta z$ $$\Delta z \leq \frac{\pi}{2} z_R \tag{8}$$

This shows that the actual image plane can be farther away from the paraxial image plane than from the beam waist location.

Figure 8:
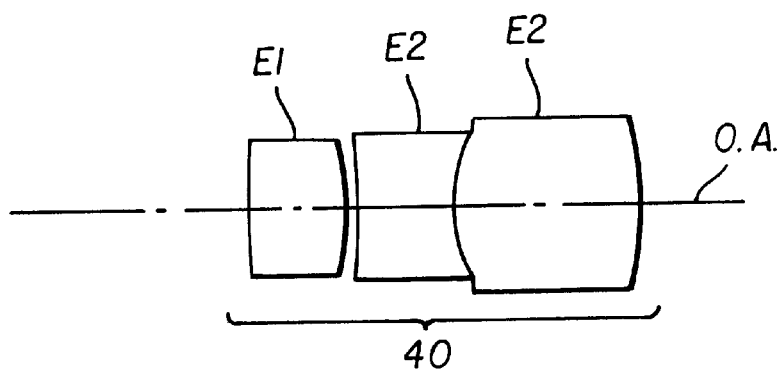
FIG. 8 is an apochromatic lens system of the first embodiment of the present invention.

An illustrative lens system which images laser beam waists of three or more wavelengths to the common location 50 is illustrated in FIG. 8 and its parameters are provided in Table 1.

TABLE 1

| Radius | Spacing | Material | $N_d$ | $V_d$ | $P_{C,s}$ |
|---|---|---|---|---|---|
| Object | 4.977 | Air | | | |
| 15.9 | 1.6 | FK51 | 1.48656 | 84.47 | .544 |
| −3.74 | 0.1 | Air | | | |
| −10.88 | 1.6 | KzFSN2 | 1.558361 | 54.16 | .555 |
| 2.3 | 3 | FK51 | 1.48656 | 84.47 | .544 |
| −5.72 | 137.535 | Air | | | |
| Image | | | | | |

In this and other similar tables Nd is the index of refraction, Vd is the Abbe V-number, $P_{C,s}$ is a partial dispersion, and all linear dimensions are provided in millimeters. The lens system 40 of Table 1 includes (from an object side) a first lens component of positive power which is a single lens element E1 and a second, cemented lens component comprising a negative lens element E2 followed by a positive lens element E3. The two lens components are located close to one another. We found that good optical performance was obtained when the ratio of the power $\phi n$ of the negative lens element E2 with respect to the power $\phi t$ of the entire lens system 40 is $$-4.1 \leq \phi n/\phi t \leq -1.3, \text{ and} \tag{9}$$

the ratio of the power $\phi p$ of the positive lens element E3 (of the cemented lens component) with respect to the power $\phi t$ of the entire lens system is $1.4 \leq \phi p/\phi t \leq 3.8$, and (10)

$|\phi n| \approx \phi p$. (11)

In the lens system 40 of the first illustrative embodiment the ratio of the power φn of the negative lens component E2 with respect to the power φt of the entire lens system 40 is −2.129 (i.e., φn/φt=−2.129). The ratio of the power φp of the positive lens element E3 (of the second lens component) with respect to the power φt of the entire lens system 40 is 2.126 (i.e., φp/φt=2.126). As we can see, the absolute power of the negative lens element E2 is about equal to the power of the positive lens element E3. The ratio of the power of the first lens component with respect to the power φt of the entire lens system is 1.15.

Figure 9:
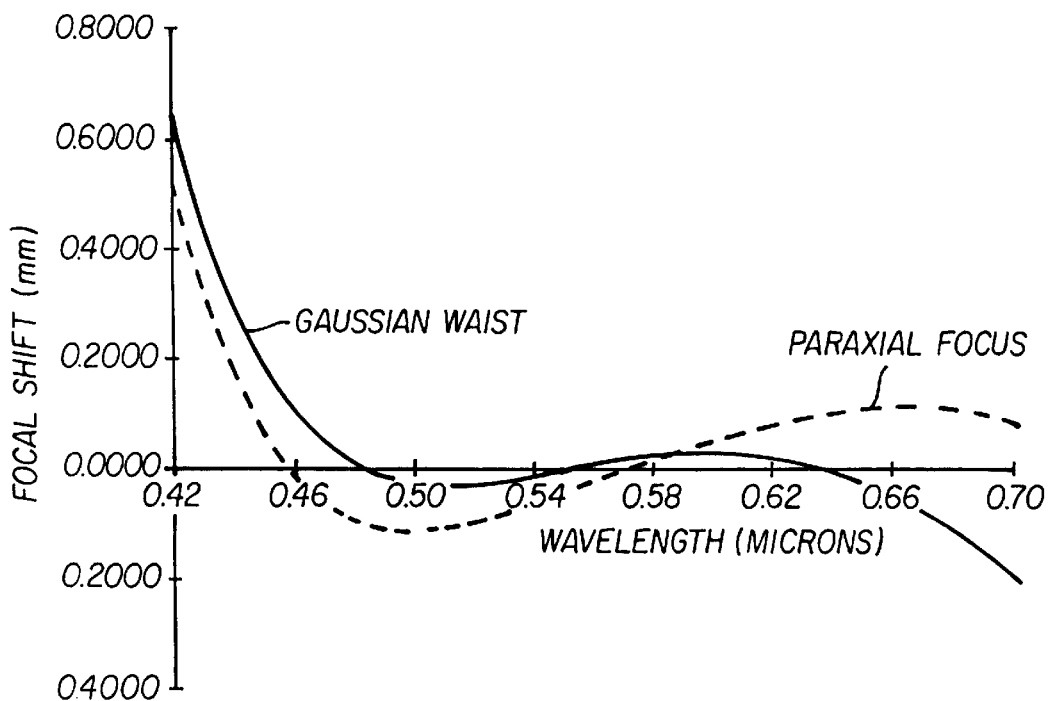
FIG. 9 shows plots of the distance from an output beam waist to the image plane versus wavelength (solid curve) and (broken curve) paraxial focus shift for the lens system of FIG. 8.
Figure 10:
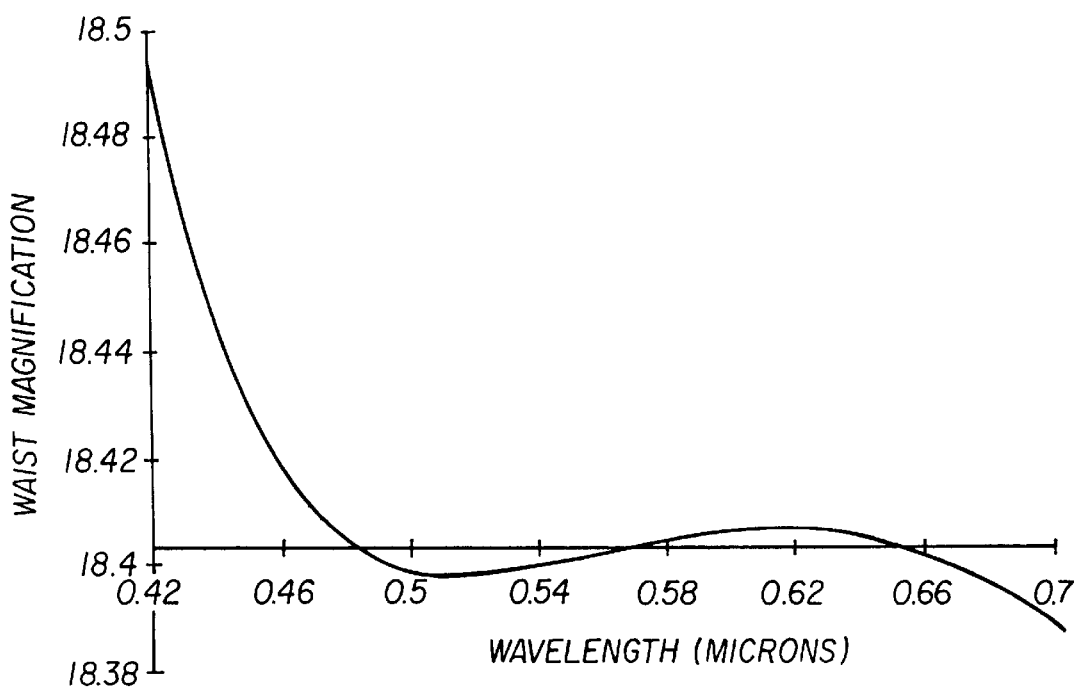
FIG. 10 is a plot of beam waist magnification versus wavelength for the lens system of FIG. 8.

FIG. 9 depicts the output beam waist shift from the image plane (solid curve) of this lens system 40 as a function of wavelength. It can be seen from this figure that there are three wavelengths where the beam waists are at the same focal position. (These are the wavelengths at the points where the solid curve crosses the horizontal axis). For comparison, the paraxial focus shift as a function of wavelength is also shown in this figure, as the dashed curve. In this lens system embodiment, the maximum amount of output beam waist separation (min. to max.) is 0.25 mm for the wavelength range of 0.46 to 0.69 microns. FIG. 10 is a plot of magnification variation ΔM versus wavelength for the first lens system embodiment 1. Lens system 40 of the first embodiment has a magnification variation ΔM of less than a 1.5% in the wavelength range from 0.46 to 0.69 microns. This lens system has a peak to valley wavefront error W of less 0.1 waves.

Figure 11:
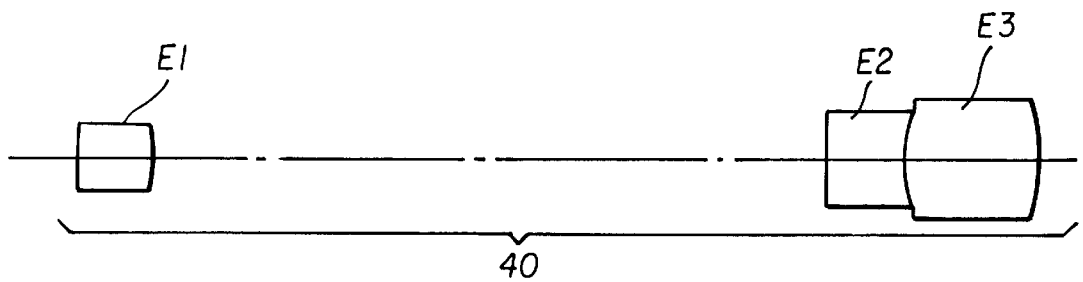
FIG. 11 is an apochromatic lens system of the second embodiment of the present invention.

An embodiment of the second lens system 40 is illustrated in FIG. 11 and its parameters are provided in Table 2.

TABLE 2

| Radius | Spacing | Glass | $N_d$ | $V_d$ | $P_{C,s}$ |
|---|---|---|---|---|---|
| Object | 3.000 | Air | | | |
| 5.527 | 1.600 | FK51 | 1.48656 | 84.47 | .544 |
| −2.888 | 14.000 | Air | | | |
| −17.268 | 1.600 | LaK8 | 1.71300 | 53.83 | .540 |
| 3.056 | 2.765 | FK51 | 1.48656 | 84.47 | .544 |
| −4.295 | 125.877 | Air | | | |
| Image | | | | | |

The lens system 40 of the second illustrative embodiment is similar to the lens system of the first embodiment except that the two lens components are separated by a relatively large distance. In the lens system of the second illustrative embodiment the ratio of the power φn of the negative lens element with respect to the power φt of the entire lens system is −2.327. The ratio of the power φp of the positive lens element E2 (of the second lens component) with respect to the power φt of the entire lens system is 2.285. As we can see, the absolute power of the negative lens element E2 is about equal to the power of the positive lens element E3. The ratio of the power of the first lens component with respect to the power of the entire lens system is 2.15.

Figure 12:
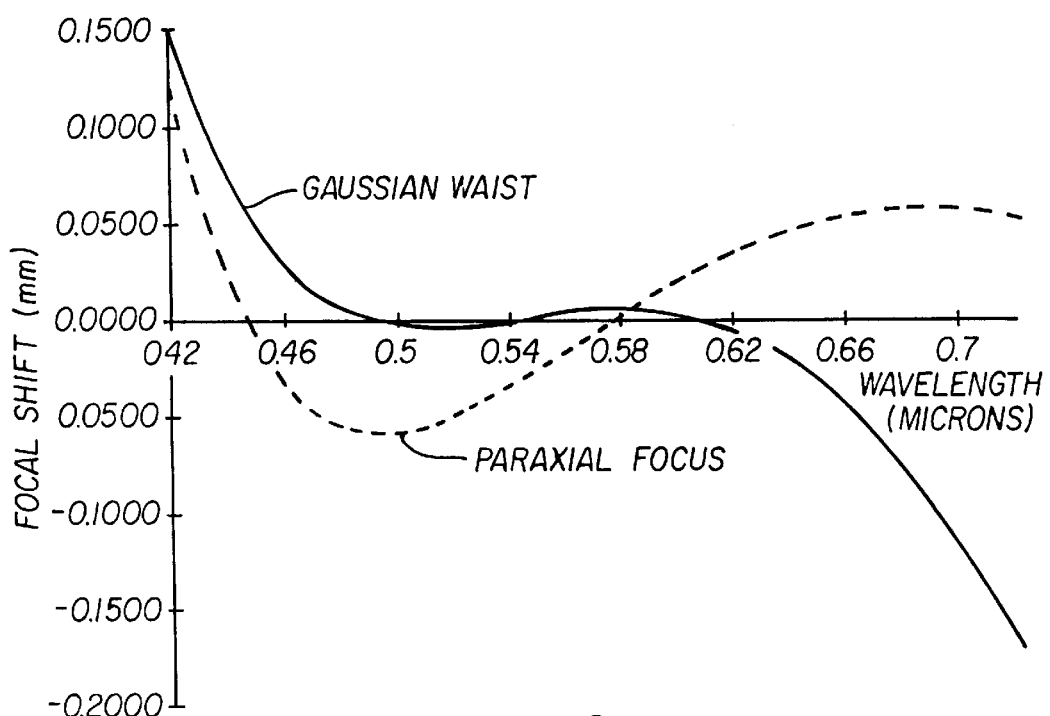
FIG. 12 is a plot of a beam waist separation from the image plane (solid curve) and (broken curve) a paraxial focus shift versus wavelength for the lens system of FIG. 11.
Figure 13:
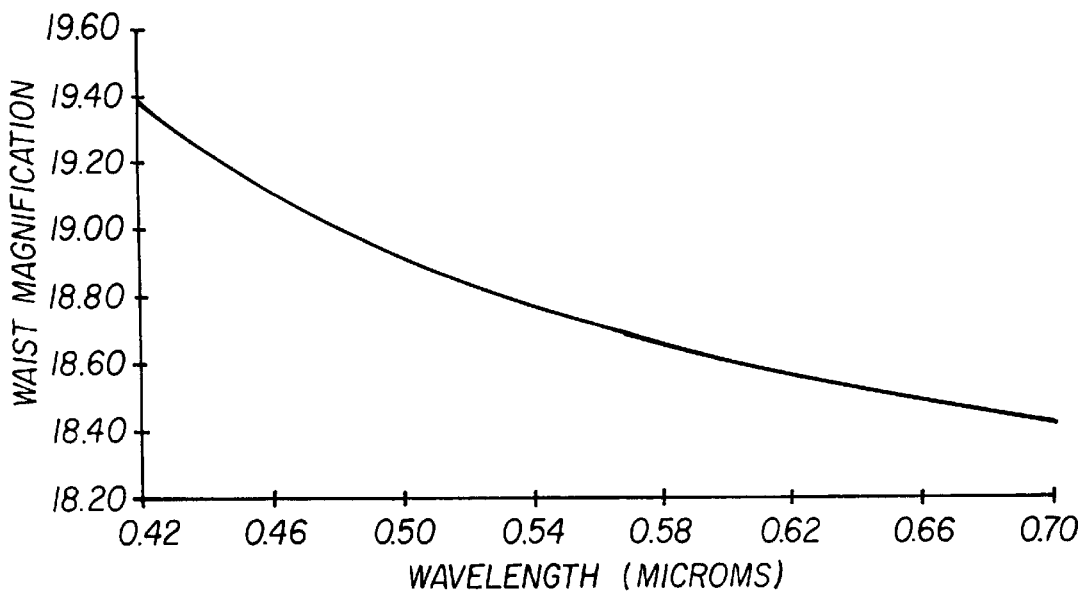
FIG. 13 is a plot of the beam waist magnification versus wavelength for the lens system of FIG. 11.

The performance of the second lens system embodiment is illustrated in FIG. 12. This figure shows that three output beam waists of different wavelengths are located at the same image planes and that there is only a small separation of beam waist locations from the paraxial image plane. FIG. 12 shows that output beam waists are located within 0.12 mm of each other, for the wavelength range of 0.46 to 0.69 microns. This is less than half that of lens system of Table 1. FIG. 13 shows the magnification variation of lens system of the second embodiment. It can be seen from that figure that there is a magnification variation ΔM of about 7% across the entire visible spectrum and about 3.7% in the wavelength range of 0.46 to 0.69 microns. The lens system of the first embodiment provides a smaller magnification variation than that of the second embodiment. The wavefront error W produced by the lens system of the second embodiment is less than 0.02 waves.

Figure 14:
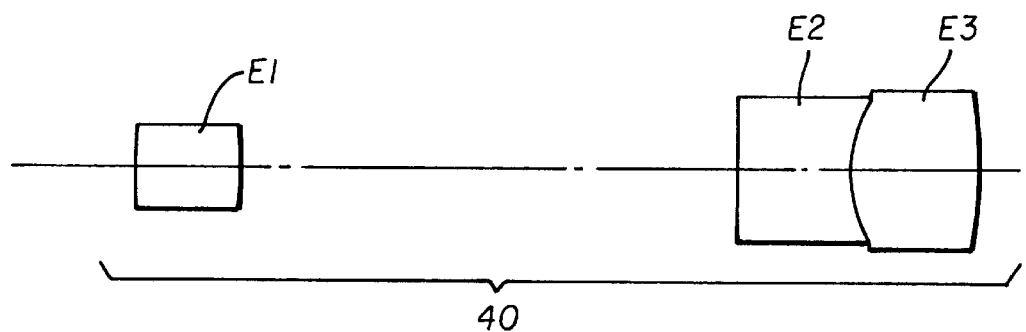
FIG. 14 is an apochromatic lens system of the third embodiment of the present invention.

A lens system of the third embodiment is illustrated in FIG. 14. Its parameters are listed in Table 3.

TABLE 3

| Radius | Spacing | Glass | $N_d$ | $V_d$ | $P_{C,s}$ |
|---|---|---|---|---|---|
| Object | 3.435 | Air | | | |
| 4.819 | 2 | PK51a | 1.52855 | 76.96 | .535 |
| −6.834 | 9.102 | Air | | | |
| 103.076 | 2 | ADF1 | 1.56500 | 52.96 | .543 |
| 2.548 | 2.431 | PK51a | 1.52855 | 76.96 | .535 |
| −9.848 | 129.877 | Air | | | |
| Image | | | | | |

In the lens system of the third embodiment the ratio of the power φn of the negative lens component E2 with respect to the power φt of the entire lens system is −1.853. The ratio of the power φp of the positive lens element E3 (of the second lens component) with respect to the power φt of the entire lens system is 2.233. As we can see, the absolute power of the negative lens element is about equal to the power of the positive lens element. The ratio of the power of the first lens component with respect to the power of the entire lens system is 1.6.

Figure 15:
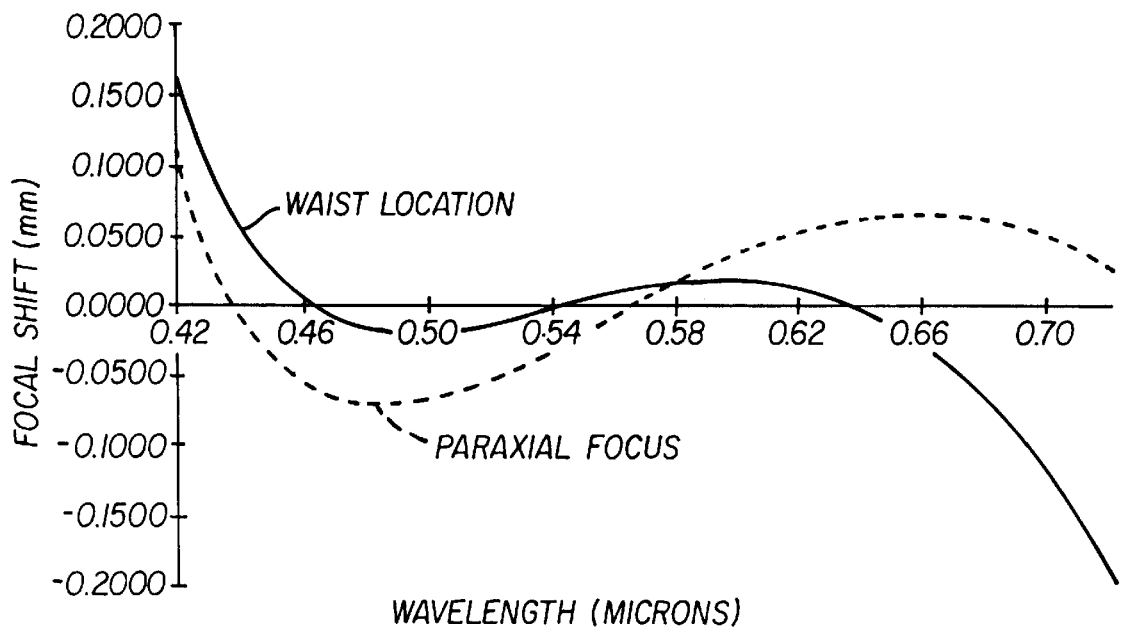
FIG. 15 is a plot of a beam waist separation from the image plane (solid curve) and a paraxial focus shift (broken curve) versus wavelength for the lens system of FIG. 14.
Figure 16:
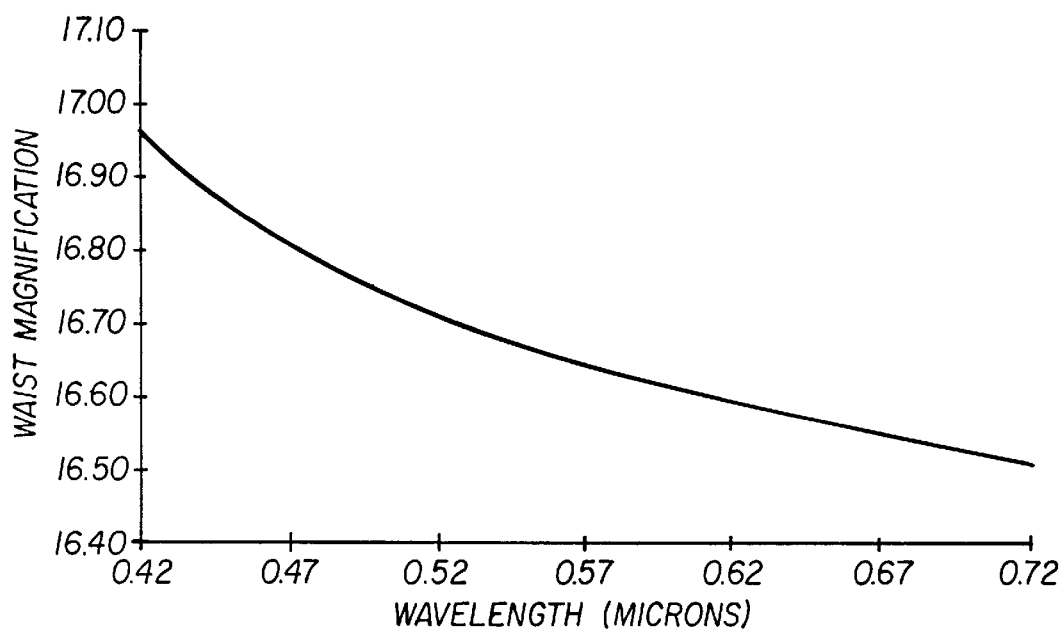
FIG. 16 is a plot of the beam waist magnification versus wavelength for the lens system of FIG. 14.

FIG. 15 shows beam waist and paraxial focal curves for the third embodiment and it illustrated that the output beam waists are focused within 0.11 mm of one another in the wavelength range of 0.46 to 0.69 microns. The magnification variation ΔM is shown in FIG. 16 and the lens system has a 1.8% variation in the wavelength range of 0.46 to 0.69 microns, about half the variation produced by the lens system of the second embodiment. The wavefront error W of this lens system is 0.01 waves.

The lens system of the present invention is capable of imaging three or more beam waists of different wavelengths to a common location at substantially the same magnification. This lens system is also capable of magnifying by 5 to 20 times laser beam waists provided by a single mode fiber. Such beam waists may be produced in the visible wavelength range, and may have an $e^{-2}$ diameter of 3 to 6 microns.

The invention has been described in detail with particular reference to certain preferred embodiments thereof, but it will be understood that variations and modifications can be effected within the spirit and scope of the invention.

What is claimed is:

1. A lens system for imaging a plurality of laser beam waists of different wavelengths located at a common location to another location, said lens system comprising a plurality of lens elements including at least one positive power lens element and at least one negative power lens element, said plurality of lens elements having radii of curvature, thicknesses, indices of refraction, Abbe V numbers and partial dispersion coefficients so as to provide in combination (i) magnification between 5 and 20;
   (ii) magnification variation less than 5% for 0.46 to 0.7 micron wavelength range; and
   (iii) beam waist images located along an optical axis with axial positions being less than 0.32 Rayleigh distances from an image plane.

2. A lens system for imaging a plurality of laser beam waists of different wavelengths located at a common location, to another location, said lens system comprising in order from an object side:

a) a first lens element of positive optical power;

b) a second lens element of negative optical power; and c) a third lens element of positive optical power; said first, second and third lens elements being adapted in combination to provide (i) magnification between 5 and 20, (ii) magnification variation is less than 5% for the wavelength range of 0.46 to 0.7 microns, and (iii) beam waist images located along an optical axis with axial positions being less than 0.32 Rayleigh distances from an image plane.

3. A lens system according to claim 2 wherein the magnification variation is less than 4%.

4. The lens system according to claim 2 wherein said second and third lens elements are cemented to one another, forming a cemented lens component.

5. A lens system according to claim 4 wherein said cemented lens component has two external radii of curvature and an internal radius of curvature, and said internal radius of curvature is shorter than the two external radii of curvature.

6. The lens system according to claim 2 in which the positive elements are made from glasses with partial dispersions that are greater than 0.53 and Abbe V-numbers that are greater than 70.

7. The lens system according to claim 2 in which the negative elements are made from glasses with partial dispersions that are greater than 0.53 and Abbe V-numbers that are in the range from 44 to 60.

8. The lens system according to claim 6 in which the negative elements are made from glasses with partial dispersions that are greater than 0.53 and Abbe V-numbers that are in the range from 44 to 60.

9. The lens system according to claim 2 wherein $$-4.1 \leq \phi n/\phi t \leq -1.3;$$

and $$-1.4 \leq \phi p/\phi t \leq 3.8;$$

where $\phi p$ is the optical power of the third lens element, $\phi n$ of the optical power of the second lens element, and $\phi t$ is the optical power of said lens system.

10. A lens system for imaging a plurality of laser beam waists of different wavelengths located at a common location, to another common location, said lens system consisting in order from an object side:

a) a first lens element of positive optical power;

b) a second lens element of negative optical power; and c) a third lens element of positive optical power, said third lens element being cemented to said second lens element; said first second and third lens elements in combination providing (i) magnification between 5 and 20, (ii) magnification variation less than 0.46 to 0.7 micron wavelength range, and (iii) beam waist images located along an optical axis with axial positions being less than 0.32 Rayleigh distances from an image plane.

11. A lens system according to claim 10 wherein said cemented lens component has two external radii of curvature and an internal radius of curvature, and said internal radius of curvature is shorter than the two external radii of curvature.

12. The lens system according to claim 10 in which the positive elements are made from glasses with partial dispersions that are greater than 0.53 and Abbe V-numbers that are greater than 70.

13. The lens system according to claim 10 in which the negative elements are made from glasses with partial dispersions that are greater than 0.53 and Abbe V-numbers that are in the range from 44 to 60.

14. The lens system according to claim 12 in which the negative elements are made from glasses with partial dispersions that are greater than 0.53 and Abbe V-numbers that are in the range from 44 to 60.

15. The lens system according to claim 10 wherein $$-4.1 \leq \phi n/\phi t \leq -1.3;$$

and $$1.4 \leq \phi p/\phi t \leq 3.8,$$

where $\phi p$ is the optical power of the third lens element, $\phi n$ of the optical power of the second lens element, and $\phi t$ is the optical power of said lens system.

16. An optical system comprising in order from an object side:

a) a single mode optical fiber providing a plurality of diverging laser beams having beam waists of different wavelengths located at a common location; and b) a lens system having a plurality of lens elements including at least one positive power lens element and at least one negative power lens element, said plurality of lens elements having radii of curvature, thicknesses, indices of refraction, Abbe V-numbers and partial dispersion coefficients so as to provide in combination (i) magnification M that is between 5 and 20; (ii) magnification variation less than 5% for 0.46 to 0.7 micron wavelength range, and (iii) beam waist images located along an optical axis with axial positions being less than 0.32 Rayleigh distances from an image plane.

17. An optical system comprising in order from an object side:

a) a single mode optical fiber providing a plurality of diverging laser beams having beam waists of different wavelengths located at a common location;

b) a first lens component of positive optical power intercepting said diverging laser beams and converging said laser beams; and c) a second lens component of positive optical power accepting said converging laser beams from said first lens component; said lens components in combination providing (i) magnification that is between 5 and 20; (ii) magnification variation less than 5% for 0.46 to 0.7 micron wavelength range, and (iii) beam waist images located along an optical axis with axial positions being less than 0.32 Rayleigh distances from an image plane.

18. An optical system according to claim 17 wherein said second lens component is a cemented lens component comprising a positive power element and a negative power lens element.

* * * * *